(12) United States Patent
Tahata et al.

(10) Patent No.: US 9,800,171 B2
(45) Date of Patent: Oct. 24, 2017

(54) PROTECTION SYSTEM FOR DC POWER TRANSMISSION SYSTEM, AC-DC CONVERTER, AND METHOD OF INTERRUPTING DC POWER TRANSMISSION SYSTEM (71) Applicant: MITSUBISHI ELECTRIC CORPORATION, Chiyoda-ku, Tokyo (JP)

(72) Inventors: Kazuyori Tahata, Tokyo (JP); Hiroki Ito, Tokyo (JP); Kunio Kikuchi, Tokyo (JP); Makoto Miyashita, Tokyo (JP); Kenji Kamei, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/116,867

(22) PCT Filed: Feb. 14, 2014

(86) PCT No.: PCT/JP2014/053527
§ 371 (c)(1),
(2) Date: Aug. 5, 2016

(87) PCT Pub. No.: WO2015/121983
PCT Pub. Date: Aug. 20, 2015

(65) Prior Publication Data
US 2017/0163170 A1 Jun. 8, 2017

(51) Int. Cl.
H02H 7/22 (2006.01)
H02M 7/155 (2006.01)
(Continued)

(52) U.S. Cl.
CPC .............. *H02M 7/155* (2013.01); *H02M 1/32* (2013.01); *H02M 7/02* (2013.01); *H02M 7/125* (2013.01); *H02M 7/217* (2013.01); *H02M 7/48* (2013.01)

(58) Field of Classification Search
CPC .......... H02H 3/16; H02M 11/00; H02M 7/02; H02M 7/155; H02J 9/062
(Continued)

(56) References Cited

U.S. PATENT DOCUMENTS 5,126,585 A * 6/1992 Boys ................. H02J 9/062
307/45
8,614,904 B2 * 12/2013 Norrga ............... H02M 7/483
363/127
(Continued)

FOREIGN PATENT DOCUMENTS

JP 59-149718 A 8/1984
JP 60-216721 A 10/1985
(Continued)

OTHER PUBLICATIONS

International Search Report (PCT/ISA/210) dated Mar. 11, 2014, by the Japanese Patent Office as the International Searching Authority for International Application No. PCT/JP2014/053527.
(Continued)

Primary Examiner — Rajnikant Patel
(74) Attorney, Agent, or Firm — Buchanan Ingersoll & Rooney PC (57) ABSTRACT An AC circuit breaker is provided between an AC system and an AC-DC converter, and a DC circuit breaker is provided between a DC line and the AC-DC converter. A bypass switch capable of short-circuiting a converter cell included in the AC-DC converter is connected to the AC-DC converter. At the time of a fault in the DC line, the bypass switch is turned on to interrupt the supply of DC power from the AC system to the DC line.

16 Claims, 12 Drawing Sheets (51) Int. Cl.
  *H02M 7/217* (2006.01)
  *H02M 1/32* (2007.01)
  *H02M 7/02* (2006.01)
  *H02M 7/48* (2007.01)
  *H02M 7/12* (2006.01)

(58) Field of Classification Search
  USPC .... 363/34–41, 95–98, 132, 137; 361/56, 88, 361/91.5, 91.8
  See application file for complete search history.

(56) References Cited

U.S. PATENT DOCUMENTS 9,178,349 B2* 11/2015 Dong ................. H02H 3/16
9,461,555 B2* 10/2016 Kumar ............... H02J 3/36

FOREIGN PATENT DOCUMENTS

| | | |
|---|---|---|
| JP | 10-290572 A | 6/1987 |
| JP | 62-123921 A | 6/1987 |
| JP | 64-055016 A | 3/1989 |
| JP | 06-113444 A | 4/1994 |
| JP | 09-233833 A | 10/1998 |
| JP | 2003-259649 A | 9/2003 |
| JP | 2009-011117 A | 1/2009 |
| JP | 2013-055885 A | 3/2013 |

OTHER PUBLICATIONS

Written Opinion (PCT/ISA/237) dated Mar. 11, 2014, by the Japanese Patent Office as the International Searching Authority for International Application No. PCT/JP2014/053527.

Japanese Office Action for Japanese Application No. 2014-520858 dated Jun. 12, 2014, and English translation (6 pages).

* cited by examiner

$t_f$: OCCURRENCE OF FAULT
$t_{BP-C}$: TURNING ON OF BYPASS SWITCH
$t_{AC-O}$: INTERRUPTION BY AC CIRCUIT BREAKER
$t_{DC-O}$: INTERRUPTION BY DC CIRCUIT BREAKER
$t_{AC-C}$: TURNING ON OF AC CIRCUIT BREAKER AND DC CIRCUIT BREAKER, OPENING OF BYPASS SWITCH
$t_{res}$: RESTARTING OF OPERATION OF CONVERTER

$t_f$: OCCURRENCE OF FAULT
$t_{BP-C}$: TURNING ON OF BYPASS SWITCH
$t_{lim}$: OPERATION OF CURRENT LIMITER
$t_{AC-O}$: INTERRUPTION BY AC CIRCUIT BREAKER
$t_{DC-O}$: INTERRUPTION BY DC CIRCUIT BREAKER
$t_{AC-C}$: TURNING ON OF AC CIRCUIT BREAKER
    AND DC CIRCUIT BREAKER,
    OPENING OF BYPASS SWITCH
$t_{res}$: RESTARTING OF OPERATION OF
    CONVERTER

PROTECTION SYSTEM FOR DC POWER TRANSMISSION SYSTEM, AC-DC CONVERTER, AND METHOD OF INTERRUPTING DC POWER TRANSMISSION SYSTEM

FIELD

The present invention relates to a protection system for a DC power transmission system, an AC-DC converter, and a method of interrupting a DC power transmission system.

BACKGROUND

In the event of a ground fault or an inter-electrode short circuit fault (hereinafter referred to simply as a "fault") in a DC line in self-excited DC power transmission using a self-turn-off semiconductor element, such as an IGBT (Insulated Gate Bipolar Transistor), the fault current continues increasing even after the converter for converting AC power to DC power (hereinafter referred to as an "AC-DC converter") is no longer being controlled because current flows in from the AC side via a freewheeling diode for protecting the AC-DC converter elements. In Patent Literature 1, for example, when no DC circuit breaker is provided for interrupting this kind of fault current in a DC line, an interruption by the AC system's AC circuit breaker connected to the AC-DC converter eliminates the fault.

The elimination of a fault in a DC line by using a DC circuit breaker may be envisaged. For example, Patent Literature 2 proposes different interrupting methods using DC circuit breakers. In such a case, Patent Literature 3 discloses a method in which a current-limiting device is provided in a DC circuit in order to limit the fault current and thereby reduce the load on the DC circuit breaker.

CITATION LIST

Patent Literature

Patent Literature 1: Japanese Patent Application Laid-Open No. 2013-55885
Patent Literature 2: Japanese Patent Application Laid-Open No. 62-123921
Patent Literature 3: Japanese Patent Application Laid-Open No. 2009-011117

SUMMARY

Technical Problem

The method of eliminating a fault in a DC line by using an AC circuit breaker as in Patent Literature 1 is problematic in that the interruption by the AC circuit breaker requires approximately several tens of ms, and moreover an attenuating current with a given circuit time constant continues flowing on the DC side for a certain time period after the interruption by the AC circuit breaker, creating a waiting time after the formation of a current zero point until the arc at the fault point is extinguished, thereby prolonging the time necessary to restart the system.

The elimination of a fault in a DC line by using a DC circuit breaker as in Patent Literature 2 is problematic in that the direct current at the time of the fault rises quickly to a high peak, which is characteristic of self-excited DC power transmission. This requires the DC circuit breaker to operate quickly to interrupt the fault current before it rises or to interrupt a large current after the peak value is reached and thus leads to an increase in size of the DC circuit breaker, leading to an increase in cost of the device.

The suppression of a current at the time of a fault by a current-limiting device provided on a DC line, as in Patent Literature 3, is problematic in that the current-limiting element is required to have a capability of limiting a current of as much as an order of a kA in addition to being tolerant of a high voltage and a large current, which inevitably leads to an increase in size. Such an increase in size of a current-limiting element leads not only to an increase in cost but also to a loss in power during the DC power transmission; thus, it is needless to say that there is a demand for avoiding such an increase in size.

The present invention has been achieved in view of the above, and an object of the present invention is to provide a protection system for a DC power transmission system, an AC-DC converter, and a method of interrupting the DC power transmission system that enables a reduction in time taken to restart the DC power transmission system while avoiding an increase in size and cost of devices.

Solution to Problem

In order to solve the above problems and achieve the object, an aspect of the present invention is a protection system for a DC power transmission system, the protection system being for use in a configuration including an AC-DC converter between an AC system and the DC power transmission system, wherein an AC circuit breaker is provided between the AC system and the AC-DC converter, a DC circuit breaker is provided between the DC power transmission system and the AC-DC converter, a bypass switch capable of short-circuiting a converter cell included in the AC-DC converter is provided inside or outside of the AC-DC converter, and, when a fault occurs in the DC power transmission system, the bypass switch is turned on to interrupt the supply of DC power from the AC system to the DC power transmission system.

Advantageous Effects of Invention

The present invention produces effects of enabling a reduction in time taken to restart a DC power transmission system while avoiding an increase in size and cost of the device.

DESCRIPTION OF EMBODIMENTS

A protection system for a DC power transmission system, an AC-DC converter, and a method of interrupting a DC power transmission system according to embodiments of the present invention will now be described with reference to the drawings. The present invention is not limited to the embodiments.

First Embodiment

Figure 1:
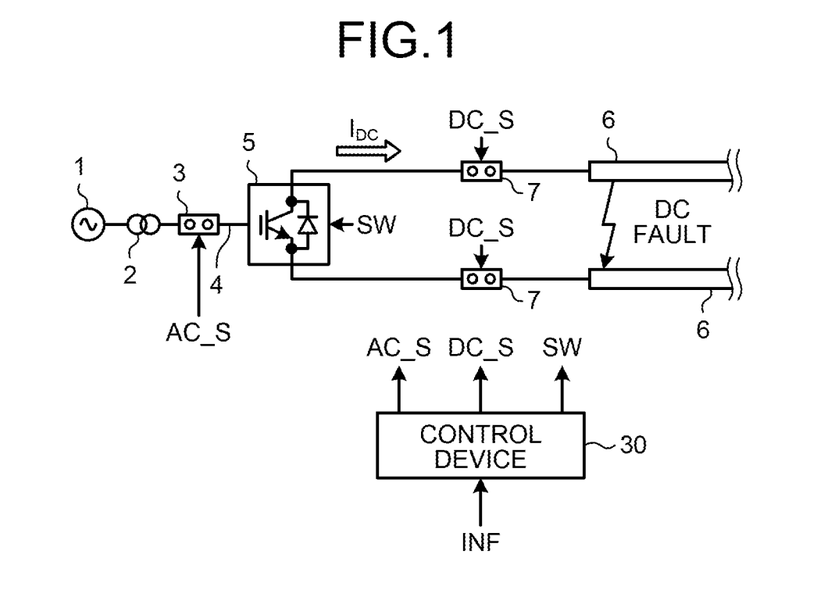
FIG. 1 is a diagram illustrating an exemplary configuration of a protection system for a DC power transmission system according to a first embodiment.

FIG. 1 is a diagram illustrating an exemplary configuration of a protection system for a DC power transmission system (hereinafter referred to simply as a "protection system") according to a first embodiment. As illustrated in FIG. 1, the protection system according to the first embodiment includes an AC circuit breaker 3, an AC-DC converter 5, a DC circuit breaker 7, and a control device 30.

AC power is supplied from an AC system 1 via a transformer 2 to the AC-DC converter 5. The AC circuit breaker 3 is provided on an AC line 4, which connects the transformer 2 to the AC-DC converter 5 electrically, and the DC circuit breaker 7 is provided on a DC line 6, which is connected to the AC-DC converter 5 on the DC side and is a power line for the DC power transmission system. The control device 30 is a control unit that controls at least the AC circuit breaker 3, the AC-DC converter 5, and the DC circuit breaker 7, and generates and outputs control signals (AC_S, SW, and DC_S) for controlling the AC circuit breaker 3, the AC-DC converter 5, and the DC circuit breaker 7 by using measurement information INF from sensors (not illustrated) disposed at appropriate positions on the AC system and the DC power transmission system.

Figure 2:
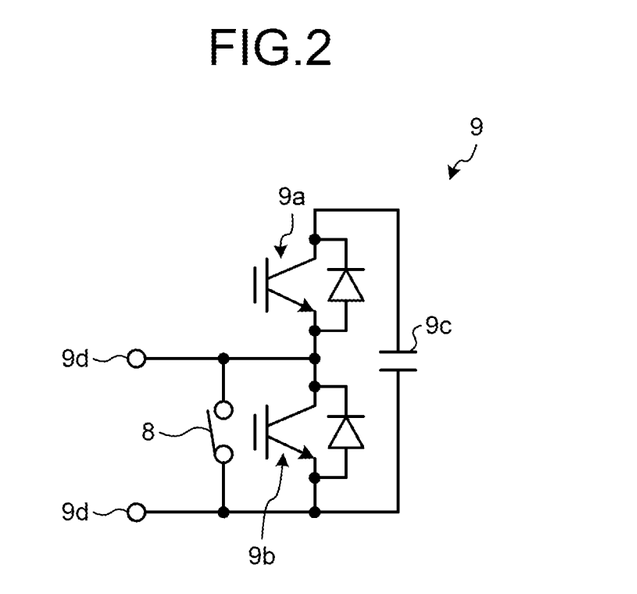
FIG. 2 is a diagram illustrating an exemplary circuit configuration of a converter cell.
Figure 3:
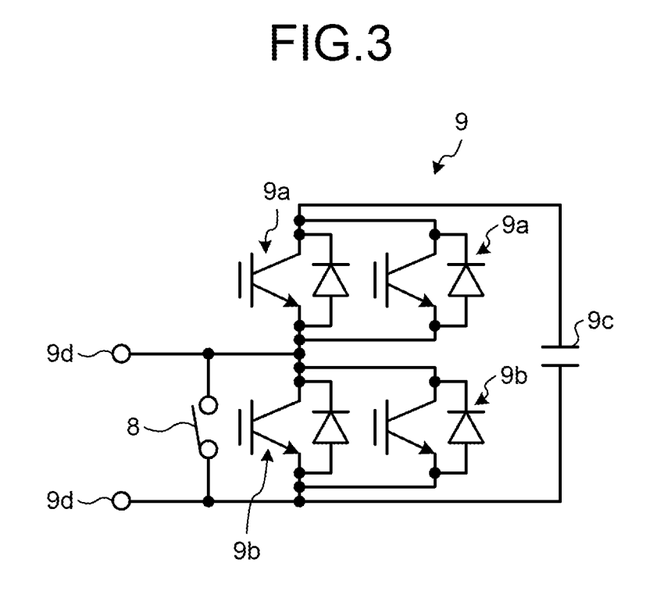
FIG. 3 is a diagram illustrating another exemplary circuit configuration of a converter cell, different from that in FIG. 2.
Figure 4:
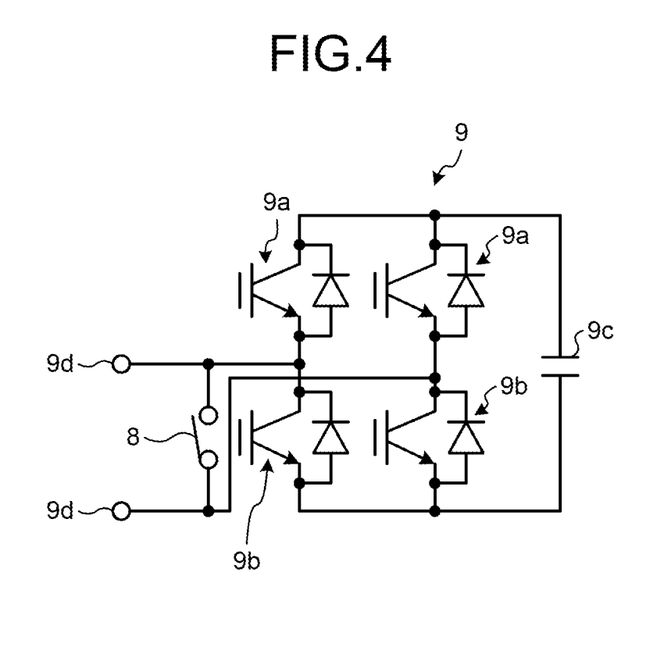
FIG. 4 is a diagram illustrating still another exemplary circuit configuration of a converter cell, different from those in FIGS. 2 and 3.
Figure 5:
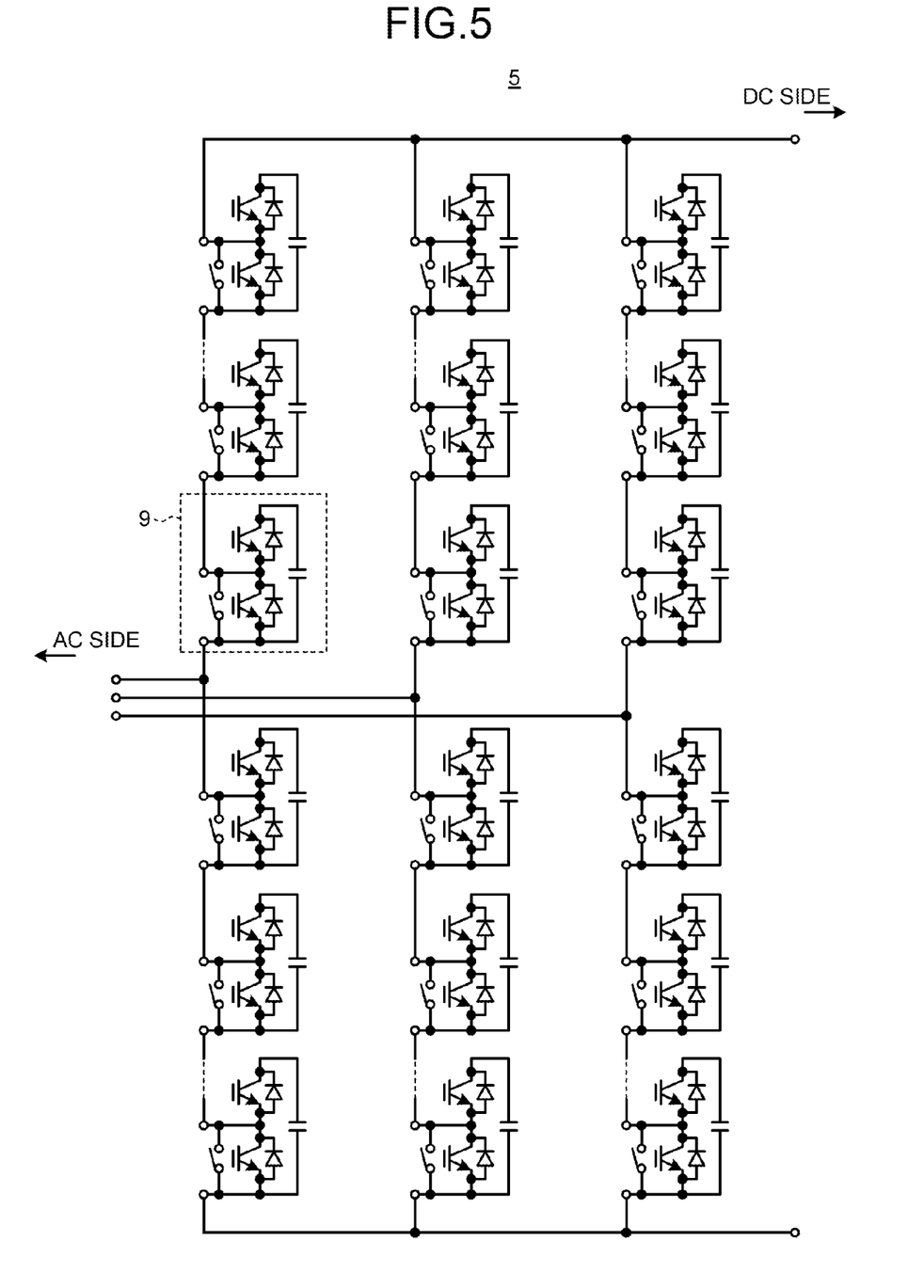
FIG. 5 is a diagram illustrating an exemplary configuration of an AC-DC converter including the converter cell in FIG. 2.

FIG. 2 is a diagram illustrating an exemplary circuit configuration of a cell 9, which is a unit forming the AC-DC converter 5 (hereinafter referred to as a "converter cell"). FIGS. 3 and 4 are diagrams illustrating other exemplary circuit configurations of the converter cell 9. FIG. 5 is a diagram illustrating an exemplary configuration of the AC-DC converter 5 including the converter cell 9 illustrated in FIG. 2.

As illustrated in FIG. 2, the converter cell 9 includes two switching elements 9a and 9b, which are connected in series and each of which includes an IGBT, which is an example of a transistor device, and a diode that is connected in anti-parallel with the IGBT. A capacitor 9c is connected across the series-connected switching elements 9a and 9b, and terminals extending from the ends of the switching element 9b are cell terminals 9d. Any one of the switching elements of the converter cell 9 (the switching element 9b in FIG. 2) is connected at its ends (a collector terminal and an emitter terminal) to a bypass switch 8.

The bypass switch 8 is a switch that is connected between the cell terminals 9d and configured to be able to short-circuit the switching element 9b by closing a contact. The bypass switch 8 allows a fault current to pass therethrough because of its ability to pass a large current for a long time period. Note that the switching elements 9a and 9b in the cell are typically made up of elements having small current-carrying capacities and thus cannot achieve the function of the bypass switch 8.

The internal configuration of the converter cell 9 is not limited to that illustrated in FIG. 2 and may be a configuration including the switching elements 9a and 9b connected in parallel as illustrated in FIG. 3 or a configuration including the switching elements 9a and 9b arranged in serial-parallel and the bypass switch 8 connected to each of the connecting points of the switching elements 9a and 9b for performing complex control as illustrated in FIG. 4. The present invention is also applicable to the converter cell 9 having a configuration such as that illustrated in FIG. 3 or 4.

The AC-DC converter 5 has an internal configuration as illustrated in FIG. 5. It includes a plurality of converter cells 9 that are connected in series to each phase of the AC side with the cell terminals 9d connected in series. In a steady-state operation, the AC circuit breaker 3 and the DC circuit breaker 7 are turned on and the bypass switches 8 are open.

Figure 6:
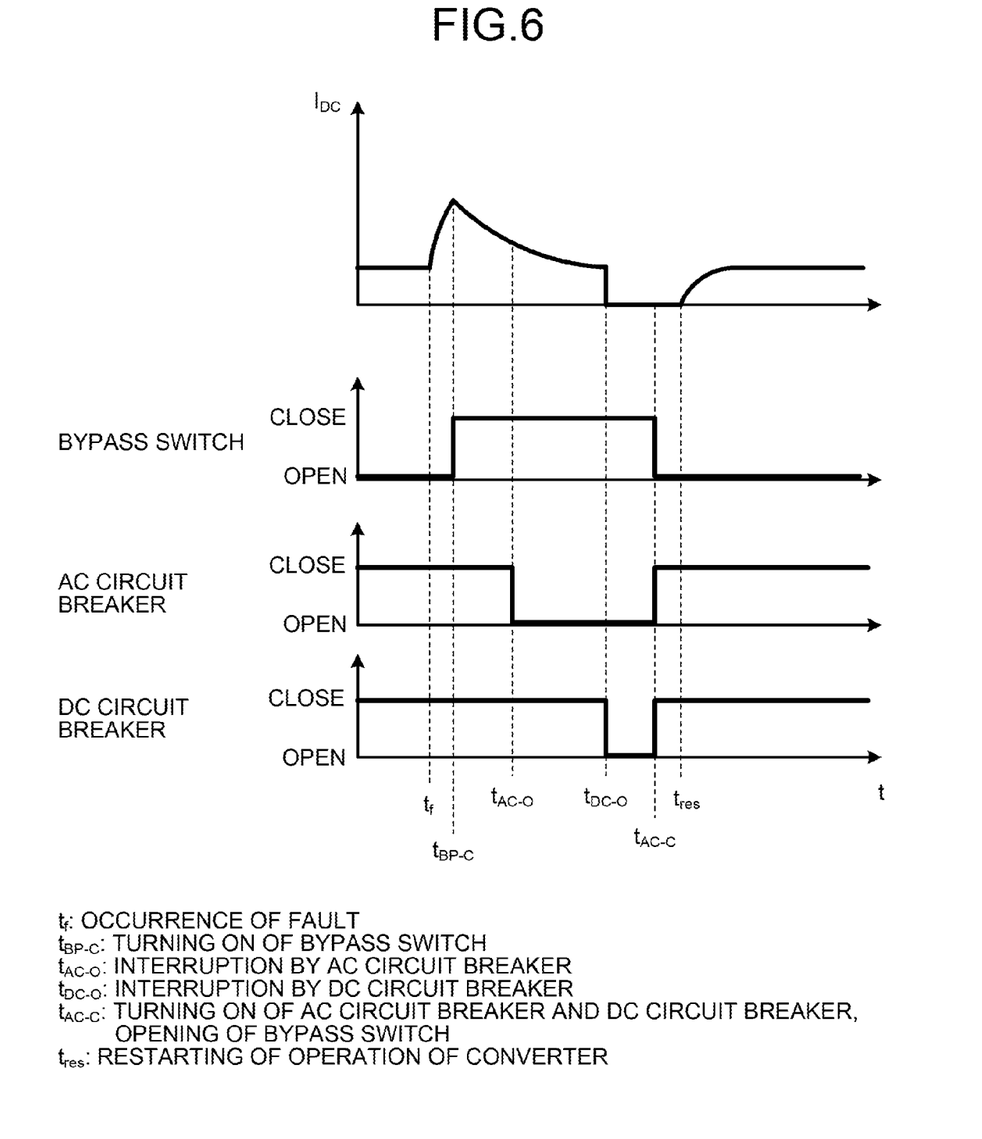
FIG. 6 is a diagram illustrating an example waveform of a direct current in the protection system according to the first embodiment and an example action sequence of each device.
Figure 7:
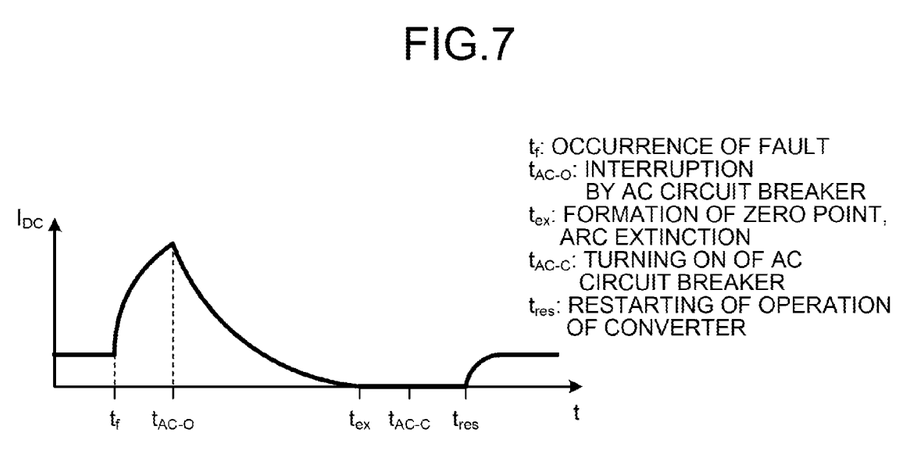
FIG. 7 is a diagram illustrating a direct current waveform in the case of a conventional technique that uses an AC circuit breaker to eliminate a fault in a DC line.

The behavior of the protection system according to the first embodiment at the time of a fault will now be described with reference to FIGS. 6 and 7. FIG. 6 is a diagram illustrating an example waveform of a direct current IDC in the protection system according to the first embodiment and an example action sequence of each of the devices. FIG. 7 is a diagram illustrating a direct current waveform in a case where an AC circuit breaker is used to eliminate a fault in the DC line as in Patent Literature 1. In these diagrams, the horizontal axis represents time, and the longitudinal axis represents the direct current $I_{DC}$ flowing through the DC line. The meaning of symbols on the horizontal axes is as follows:

$t_f$: occurrence of a fault (FIGS. 6 and 7)
$t_{BP\text{-}C}$: turning on of the bypass switches (FIG. 6)
$t_{AC\text{-}O}$: interruption by the AC circuit breaker (FIGS. 6 and 7)
$t_{ex}$: generation of a zero point, and arc extinction (FIG. 7)

$t_{DC-O}$: interruption by the DC circuit breaker (FIG. 6)
$t_{AC-C}$: turning on of the AC circuit breaker (FIGS. 6 and 7), turning on of the DC circuit breaker, and opening of the bypass switches (FIG. 6)
$t_{res}$: restarting of the operation of the converter (FIGS. 6 and 7)

As illustrated in FIG. 7, when an AC circuit breaker is used to eliminate a fault in the DC line, the interruption by the AC circuit breaker (tf to tAC-O) takes approximately several tens of ms. Additionally, an attenuating current with a given circuit time constant flows on the DC side for a certain time period even after the interruption by the AC circuit breaker (tAC-O to tex). Furthermore, since there is a waiting time after the formation of a current zero point until an arc at the fault point is extinguished (tex to tAC-C), a long time is necessary to restart the system (tAC-C to $t_{res}$).

The protection system according to the first embodiment behaves as described below at the time of a fault. A direct current having a rated value flows in the steady state until a fault occurs in the DC line 6 at a time tf when the direct current rises rapidly. Turning on all the bypass switches 8 in the converter cells 9 simultaneously at a time tBP-C creates a short circuit condition on the AC side, preventing a current from flowing into the DC side. Hence, the direct current starts attenuating with a given circuit time constant at the point in time tBP-C. Subsequently, the AC circuit breaker 3 interrupts the short-circuit current on the AC side at a time tAC-O. The DC circuit breaker 7 then interrupts the attenuated direct current at a time tDC-O to eliminate the fault. After the elimination of the fault, the AC circuit breaker 3 and the DC circuit breaker 7 are turned on and all the bypass switches 8 in the converter cells 9 are opened simultaneously at a time tAC-C. All of these actions should be performed in no particular order before a time $t_{res}$, which is when the converter is restarted.

Although it has been described above that all the bypass switches 8 in the converter cells 9 are turned on simultaneously or opened simultaneously, some variability in the turning-on timing and the opening timing due to variations in characteristic of the bypass switches 8 is permissible. It is needless to say that variations in the turning-on timing and the opening timing between the bypass switches 8 are preferably small.

The protection system according to the first embodiment can achieve the behavior described above to eliminate a fault more quickly than the method of eliminating a fault by using only a conventional AC circuit breaker, thereby enabling the AC-DC converter 5 to restart its operation sooner.

As described above, the protection system according to the first embodiment attenuates a fault current quickly by using the bypass switches and interrupts the attenuated current by using the DC circuit breaker, thereby enabling the entire system to restart quickly.

Additionally, the protection system according to the first embodiment allows the DC circuit breaker to interrupt the attenuated direct current; thus, a reduction in size of the system can be expected, imposition of excessive loads on each of the devices can be prevented, and a reduction in cost of the entire system configuration can be achieved.

Second Embodiment

Figure 8:
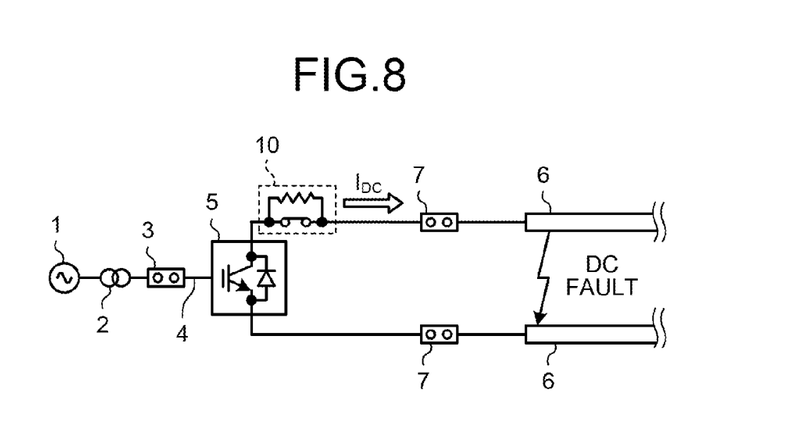
FIG. 8 is a diagram illustrating an exemplary configuration of a protection system according to a second embodiment.

FIG. 8 is a diagram illustrating an exemplary configuration of a protection system according to a second embodiment. The second embodiment includes, in addition to the components in the first embodiment, a current limiter 10, which increases the circuit resistance component of the DC line 6. The current limiter 10 is made up of, for example, a device including a high-speed switch, such as a semiconductor element, and a resistive element arranged in parallel. The configurations of the other components are identical or similar to those of the first embodiment illustrated in FIG. 1. These components are designated with identical symbols, and duplicate description is omitted.

Figure 9:
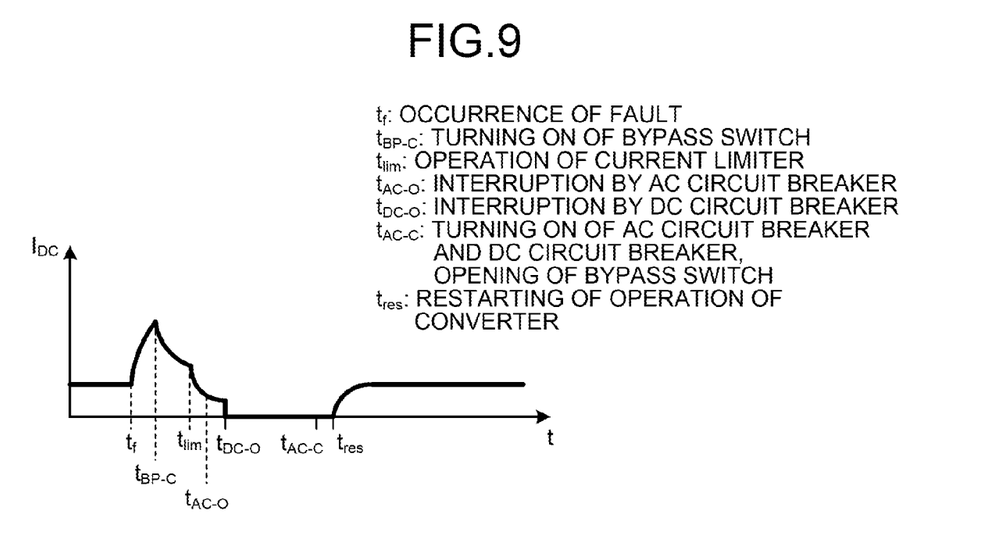
FIG. 9 is a diagram illustrating a direct current waveform in the second embodiment.

FIG. 9 is a diagram illustrating a direct current waveform in the second embodiment. The meanings of symbols on the horizontal axis are as follows:
$t_f$: occurrence of a fault
$t_{BP-C}$: turning on of the bypass switches
$t_{lim}$: operation of the current limiter
$t_{AC-O}$: interruption by the AC circuit breaker
$t_{DC-O}$: interruption by the DC circuit breaker
$t_{AC-C}$: turning on of the AC circuit breaker, turning on of the DC circuit breaker, and opening of the bypass switches
$t_{res}$: restarting of the operation of the converter With the bypass switches 8 turned on at the time tBP-C, the direct current has a waveform attenuating with a given circuit time constant. After this, operating the current limiter 10 at a time $t_{lim}$ reduces the circuit time constant, which allows the direct current to start attenuating even more quickly. These behaviors enable a reduction in time taken to eliminate a fault in comparison with the first embodiment.

As described above, the protection system according to the second embodiment enables the system to restart even more quickly by using the current limiter.

Third Embodiment

Figure 10:
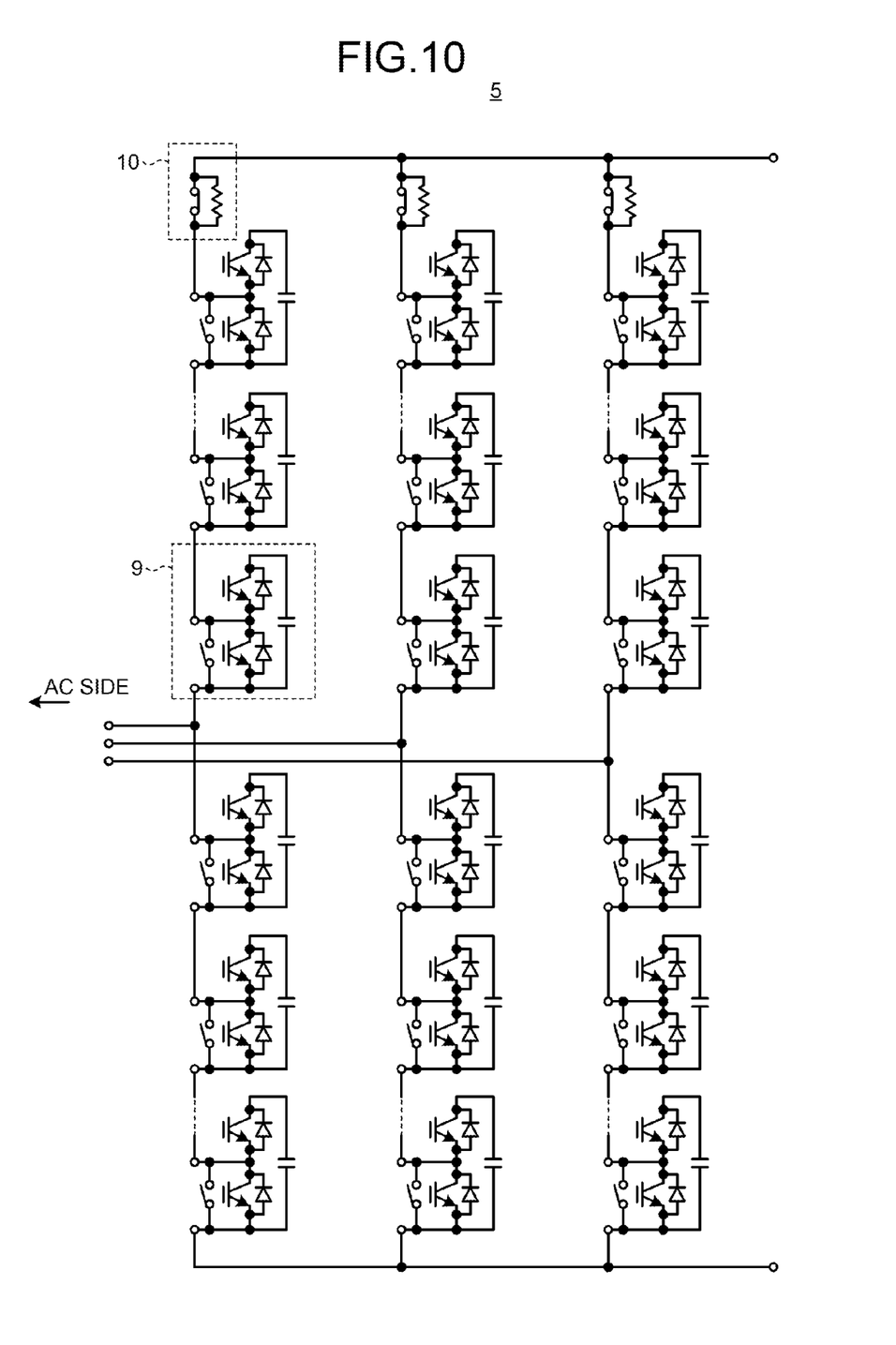
FIG. 10 is a diagram illustrating an exemplary configuration of an AC-DC converter in a protection system according to a third embodiment.

FIG. 10 is a diagram illustrating an exemplary configuration, different from that in FIG. 5, of an AC-DC converter in a protection system according to a third embodiment. The third embodiment includes, in addition to the components in the first embodiment illustrated in FIG. 5, the current limiter 10, which increases the resistance component of the power line, inside the AC-DC converter 5 for each phase.

The use of the AC-DC converter 5 illustrated in FIG. 10 achieves actions similar to those of the second embodiment to attenuate the direct current rapidly at the time of a fault and thereby enables a reduction in time taken to eliminate the fault. Additionally, because the current limiter 10 is provided for each phase in the AC-DC converter 5 in the third embodiment, each of the current limiters 10 can limit a current resulting from the division of the current into each phase. Although this increases the number of the current limiters 10, the size of each of the current limiters 10 can be reduced.

As described above, the protection system according to the third embodiment enables the system to restart even more quickly by using the current limiters.

Fourth Embodiment

Figure 11:
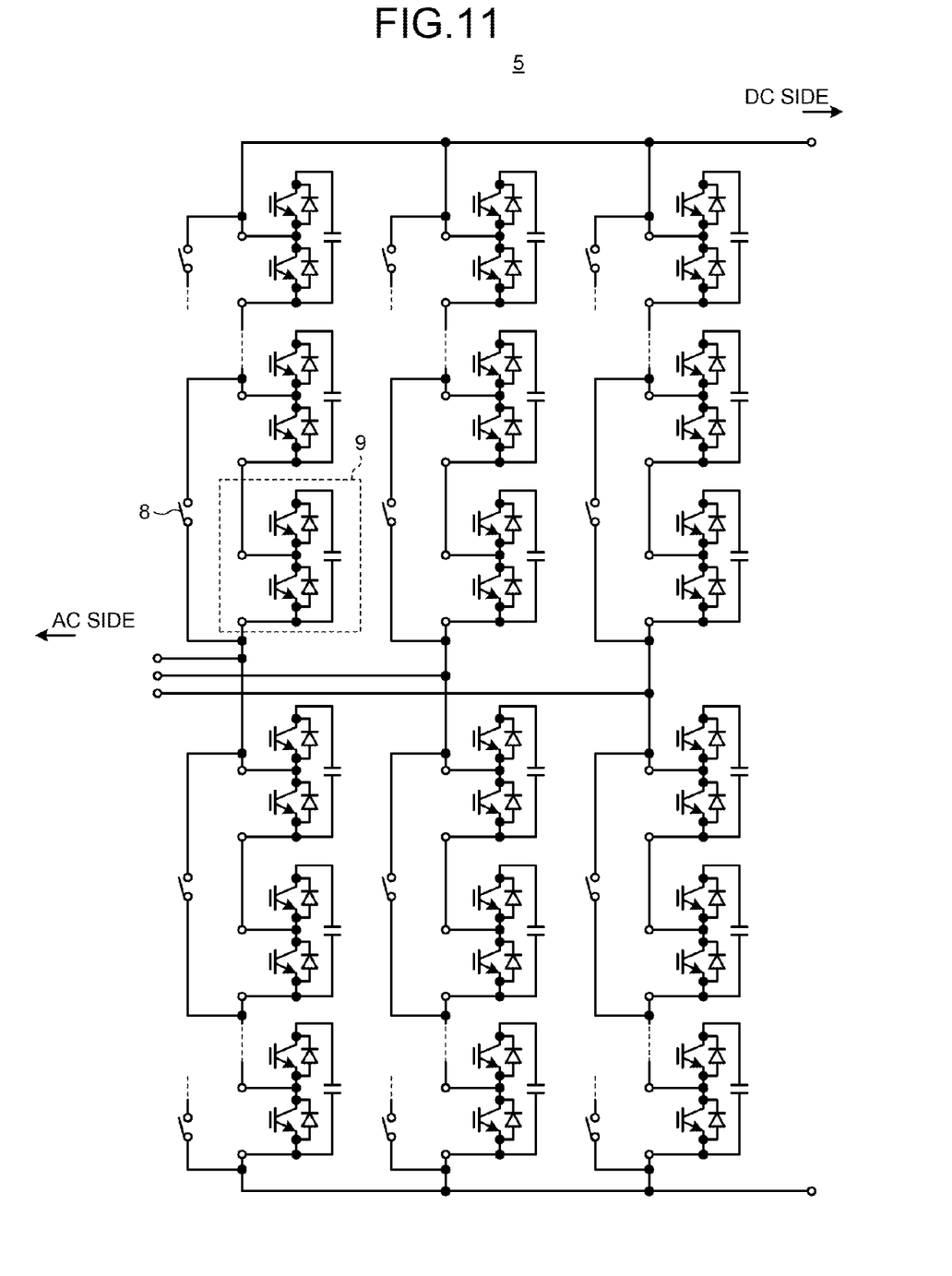
FIG. 11 is a diagram illustrating an exemplary configuration of an AC-DC converter in a protection system according to a fourth embodiment.

FIG. 11 is a diagram illustrating an exemplary configuration, different from those in FIGS. 5 and 10, of an AC-DC converter in a protection system according to the fourth embodiment. In the fourth embodiment, the configuration is such that one bypass switch 8 is connected to a cell group made up of a plurality of cells 9 (two cells in the example in FIG. 11).

The use of the AC-DC converter 5 illustrated in FIG. 11 enables a reduction in the number of the bypass switches 8, thereby enabling a reduction in total cost, despite an increase in the rated voltages of the bypass switches 8. Additionally, the reduction in the number of switches facilitates achieving control synchronism, and thus an improvement in reliability can be expected.

As described above, the protection system according to the fourth embodiment provides one bypass switch for a cell group and thereby enables a reduction in cost and an improvement in reliability.

Fifth Embodiment

Figure 12:
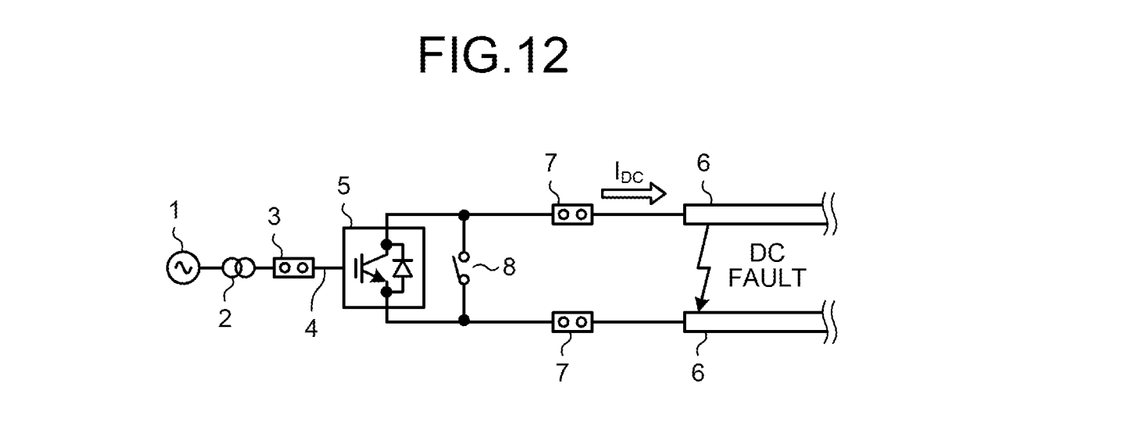
FIG. 12 is a diagram illustrating an exemplary configuration of a protection system according to a fifth embodiment.

FIG. 12 is a diagram illustrating an exemplary configuration of a protection system according to a fifth embodiment. In the fifth embodiment, the configuration is such that one or more bypass switches 8 (one in the example in FIG. 12) are connected between the terminals of the AC-DC converter 5 on the DC side.

With the use of the protection system illustrated in FIG. 12, an effect similar to that of the first embodiment can be expected by turning on the bypass switch 8 at the time of a DC fault. Additionally, the fifth embodiment can produce its effect with a minimum of one bypass switch 8 provided between the terminals on the DC side, thus enabling a reduction in the number of the bypass switches 8 in comparison with the fourth embodiment, which requires the bypass switch 8 for each phase in the AC-DC converter 5; hence, a further improvement in reliability can be expected. Furthermore, it becomes possible to place the bypass switch 8 outside the AC-DC converter 5, which increases flexibility in the layout of the DC power transmission system.

As described above, the protection system according to the fifth embodiment places the bypass switch between the terminals of the AC-DC converter on the DC side. This enables a reduction in the number of bypass switches, thereby enabling a reduction in total cost, achievement of the control synchronism, and improvement of the reliability.

Sixth Embodiment

Figure 13:
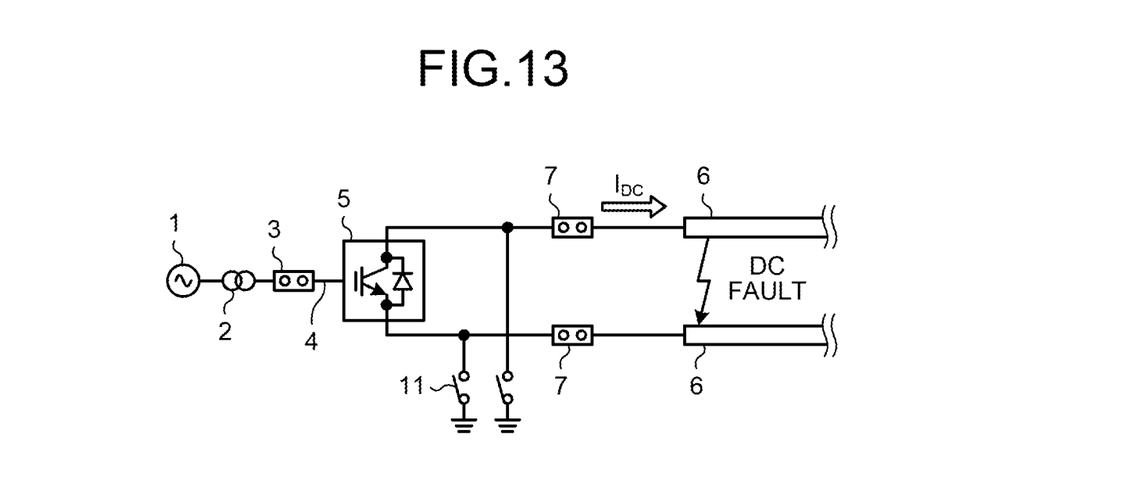
FIG. 13 is a diagram illustrating an exemplary configuration of a protection system according to a sixth embodiment.

FIG. 13 is a diagram illustrating an exemplary configuration of a protection system according to a sixth embodiment. In the sixth embodiment, the configuration is such that a grounding switch 11, which grounds the AC-DC converter 5, is provided on each of the positive and negative electrodes of the AC-DC converter 5 on the DC side.

With the use of the protection system illustrated in FIG. 13, an effect similar to that of the first embodiment can be expected by operating the grounding switches 11 connected to the ground at the time of a fault.

As described above, the protection system according to the sixth embodiment places the grounding switch on each of the positive and negative electrodes of the AC-DC converter on the DC side. This enables a reduction in the number of components, thereby enabling a reduction in cost and improvement of the reliability.

Seventh Embodiment

Figure 14:
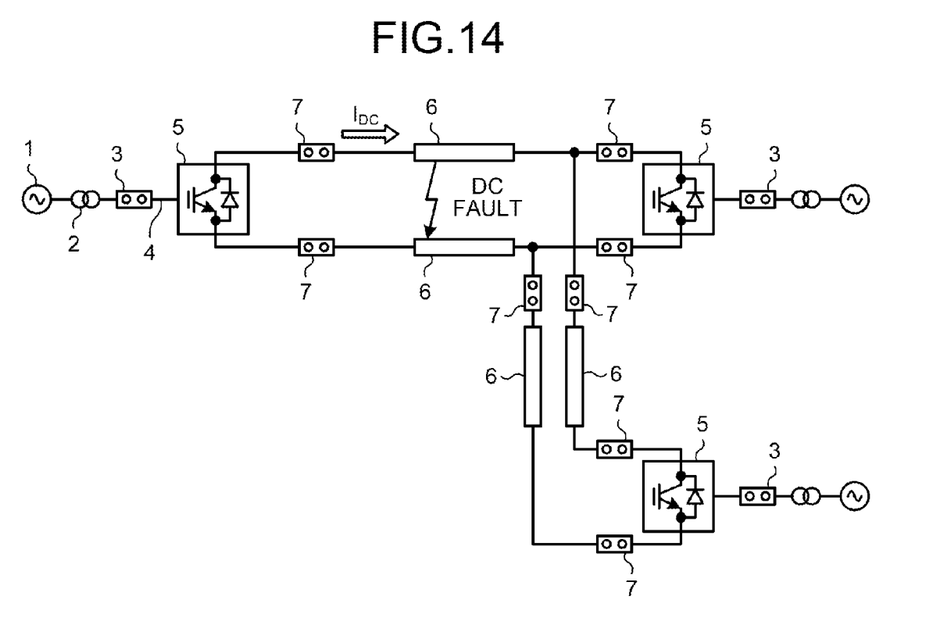
FIG. 14 is a diagram illustrating an exemplary configuration of a protection system according to a seventh embodiment.

FIG. 14 is a diagram illustrating an exemplary configuration of a protection system according to a seventh embodiment. The seventh embodiment assumes a multi-terminal DC power transmission system in which three or more AC systems 1 are interconnected by the DC lines 6 and includes the AC circuit breaker 3 on the AC side of each of the AC-DC converters 5 and the DC circuit breaker 7 on each side of the DC line 6 on the DC side of each of the AC-DC converters 5. Each of the AC-DC converters 5 includes the bypass switches 8 (see FIG. 2).

The operation of the AC-DC converter 5 that is located closest to a fault point is similar to that in the first embodiment. That is, the bypass switches 8 of the AC-DC converter 5 are turned on to attenuate a direct current, and the DC circuit breaker 7 interrupts the attenuated current for a fast restart. By restarting quickly the AC-DC converter 5 that is located closest to the fault point, the AC-DC converter 5 that is located far from the fault point is allowed to continue operating without stopping because the voltage of the DC line is restored before it is stopped due to the effect of the fault.

It is needless to say that the configurations described in the second to sixth embodiments can be employed for the protection system according to the seventh embodiment illustrated in FIG. 14.

As described above, the protection system according to the seventh embodiment, which can be employed for a multi-terminal system, enables the AC-DC converter that is located closest to a fault point to restart quickly and thus allows the AC-DC converter that is located far from the fault point to continue operating without stopping, thereby enabling the effect of the fault on the system to be localized.

Eighth Embodiment

Figure 15:
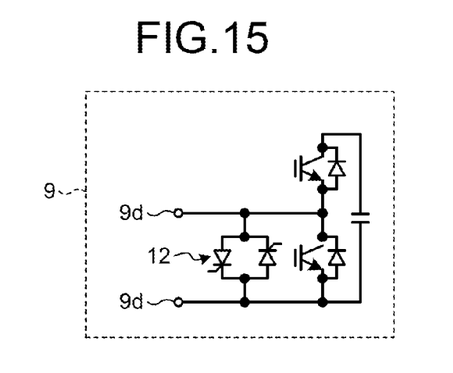
FIG. 15 is a diagram illustrating an exemplary configuration of a cell of an AC-DC converter in a protection system according to an eighth embodiment.

FIG. 15 is a diagram illustrating an exemplary configuration, different from that in FIG. 2, of a cell of an AC-DC converter in a protection system according to an eighth embodiment. The eighth embodiment includes a bidirectional semiconductor switch 12, in place of the bypass switch 8 illustrated in FIG. 2, between the cell terminals 9d.

It is needless to say that the configuration of the eighth embodiment can be employed for the protection systems according to the second to seventh embodiments.

In the steady-state operation, the bidirectional semiconductor switches 12 are off; therefore, allowing no current to flow therethrough. When a fault occurs in the DC line 6, the bidirectional semiconductor switches 12 are turned on to create a short circuit condition on the AC side, preventing a current from flowing into the DC side. Here, it is assumed that an element employed for the bidirectional semiconductor switch 12 is a large capacity element that allows a large current to flow therethrough for a long time period and thus allows a fault current to pass therethrough. Note that the switching elements 9a and 9b in the cell are typically made up of elements having small current-carrying capacities and require turning off or bypassing by another device at the time of a fault; thus, the switching elements 9a and 9b cannot achieve the operation described above. With the operation described above, an effect similar to those of the first to seventh embodiments can be obtained. Additionally, the use of the bidirectional semiconductor switches enables even faster operation than the use of the bypass switch.

As described above, the protection system according to the eighth embodiment attenuates a fault current quickly by using the bidirectional semiconductor switches and interrupts the attenuated current by using the DC circuit breaker, thereby enabling the entire system to restart quickly.

Ninth Embodiment

Figure 16:
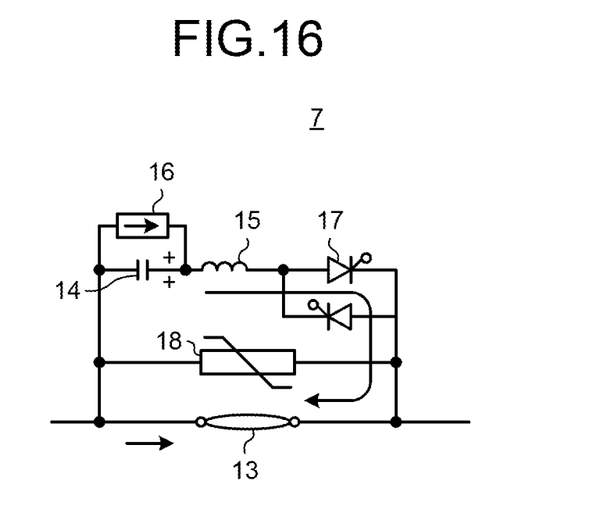
FIG. 16 is a diagram illustrating an exemplary configuration of a DC circuit breaker (of a forced arc-extinguishing scheme) that can be employed for the protection systems according to the first to eighth embodiments.

FIG. 16 is a diagram illustrating an exemplary configuration of the DC circuit breaker 7 that can be employed for the protection systems according to the first to eighth embodiments. In this embodiment, a DC circuit breaker of a forced arc-extinguishing scheme is employed as the DC circuit breaker 7 in the first to eighth embodiments.

The forced arc-extinguishing scheme is a scheme for a DC circuit breaker in which a turn-on switch 17 is turned on to discharge a charge from a capacitor 14, which is charged in advance by a unit like a DC power source 16, such that a resonance current with a reactor 15 is superimposed on a direct current to form a current zero point, thereby enabling an interruption unit 13 to perform an interruption. After the interruption by the interruption unit 13, a varistor 18 operates to suppress the overvoltage generated at the interruption unit 13.

The use of the DC circuit breaker 7 of the forced arc-extinguishing scheme having a configuration as described above enables fast interruption of a direct current, thereby enabling an increase in the speed with which the entire system is restarted.

Additionally, the DC circuit breaker employed in the protection systems according to the first to eighth embodiments only has to interrupt an attenuated direct current, thereby enabling a reduction in the peak value of a resonance current created by the capacitor 14 and the reactor 15 and thus enabling a reduction in size of the capacitor 14 and the DC power source 16 working as its charging unit.

Tenth Embodiment

Figure 17:
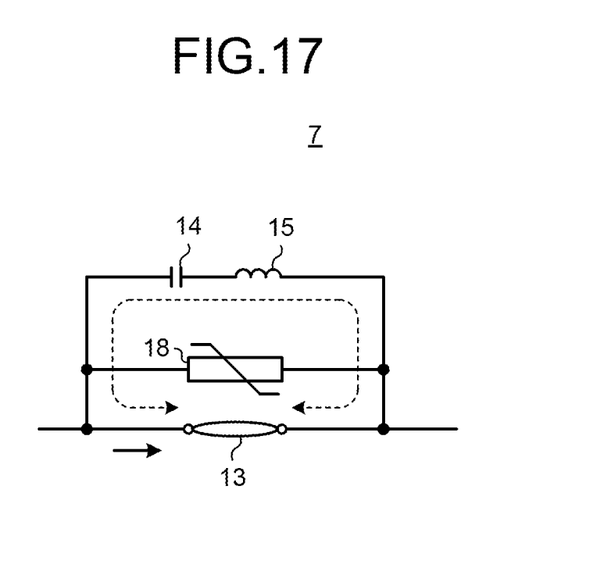
FIG. 17 is a diagram illustrating an exemplary configuration of a DC circuit breaker (of a self-excited-oscillation arc-extinguishing scheme) that can be employed for the protection systems according to the first to eighth embodiments.

FIG. 17 is a diagram illustrating an exemplary configuration of the DC circuit breaker 7 that can be employed for the protection systems according to the first to eighth embodiments. In this embodiment, a DC circuit breaker of a self-excited-oscillation arc-extinguishing scheme is employed as the DC circuit breaker 7 in the first to eighth embodiments.

The self-excited-oscillation arc-extinguishing scheme is a scheme for a DC circuit breaker in which a current zero point is formed by a current oscillation magnifying phenomenon due to the interaction of an arc with the capacitor 14 and the reactor 15. After the interruption by the interruption unit 13, the varistor 18 operates to suppress the overvoltage generated at the interruption unit 13.

The DC circuit breaker 7 of such a self-excited-oscillation arc-extinguishing scheme has a simple configuration and can be achieved at a low cost. Hence, an increase in the speed with which the entire system is restarted can be achieved at a low cost.

Additionally, the DC circuit breaker employed in the protection systems according to the first to eighth embodiments only has to interrupt an attenuated direct current, thereby enabling a reduction in the peak value of the current generated by the oscillation magnifying phenomenon and thus enabling a reduction in size of the capacitor 14.

Eleventh Embodiment

Figure 18:
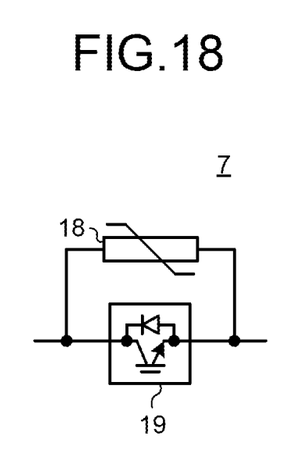
FIG. 18 is a diagram illustrating an exemplary configuration of a DC circuit breaker (of a semiconductor scheme) that can be employed for the protection systems according to the first to eighth embodiments.

FIG. 18 is a diagram illustrating an exemplary configuration of the DC circuit breaker 7 that can be employed for the protection systems according to the first to eighth embodiments. In this embodiment, a DC circuit breaker of a semiconductor scheme is employed as the DC circuit breaker 7 in the first to eighth embodiments.

The semiconductor scheme is a scheme in which a direct current is interrupted by a semiconductor element 19. This scheme involves a relatively high cost, although it can operate faster than the mechanical DC circuit breakers described in the ninth and tenth embodiments. After the interruption by the semiconductor element 19, the varistor 18 operates to suppress the overvoltage generated at the semiconductor element 19.

Such a method in which the DC circuit breaker 7 of the semiconductor scheme is used can be regarded as a combination of a semiconductor element and a mechanical switch. Hence, advantages of a semiconductor element and a mechanical switch can be used, enabling a further increase in the speed with which the entire system is restarted.

Additionally, the DC circuit breaker employed in the protection systems according to the first to eighth embodiments only has to interrupt an attenuated direct current, thereby enabling a reduction in current-carrying capacity of the semiconductor element that performs the interruption and thus enabling a reduction in size of the semiconductor element 19. Furthermore, the energy for the interruption can be reduced, thus also enabling a reduction in size of the varistor 18.

Note that the configurations described in the first to eleventh embodiments are examples of the configuration of the present invention. Combining the present invention with different publicly known techniques is possible, and partial omissions and other modifications are of course also possible without departing from the spirit of the present invention.

INDUSTRIAL APPLICABILITY

As described above, the present invention is useful as a protection system for a DC power transmission system that can achieve a reduction in time taken to restart the DC power transmission system while avoiding an increase in size and cost of the devices.

REFERENCE SIGNS LIST

1 AC system, 2 transformer, 3 AC circuit breaker, 4 AC line, 5 AC-DC converter, 6 DC line, 7 DC circuit breaker, 8 bypass switch, 9 cell, 9*a* and 9*b* switching element, 9*c* capacitor, 9*d* cell terminal, 10 current limiter, 11 grounding switch, 12 bidirectional semiconductor switch, 13 interruption unit, 14 capacitor, 15 reactor, 16 DC power source, 17 turn-on switch, 18 varistor, 19 semiconductor element, 30 control device.

The invention claimed is:

1. A protection system for a DC power transmission system, the protection system being for use in a configuration including an AC-DC converter between an AC system and the DC power transmission system, wherein
   a DC circuit breaker is provided between the DC power transmission system and the AC-DC converter,
   a bypass switch capable of short-circuiting a converter cell included in the AC-DC converter is connected to an inside of the AC-DC converter or an outside of the AC-DC converter on an AC side, and,
   when a fault occurs in the DC power transmission system, the bypass switch is turned on to interrupt supply of DC power from the AC system to the DC power transmission system.

2. The protection system for a DC power transmission system according to claim 1, wherein, after the bypass switch is turned on, the DC circuit breaker performs an interruption.

3. The protection system for a DC power transmission system according to claim 1, further comprising a current limiter outside the AC-DC converter on a DC side.

4. The protection system for a DC power transmission system according to claim 1, further comprising a current limiter inside the AC-DC converter for each phase.

5. The protection system for a DC power transmission system according to claim 1, wherein the bypass switch is provided for each of the converter cells.

6. The protection system for a DC power transmission system according to claim 1, wherein the bypass switch is provided for a cell group including two or more of the converter cells connected in series.

7. The protection system for a DC power transmission system according to claim 1, further comprising a grounding switch that connects a DC side of the AC-DC converter to ground.

8. The protection system for a DC power transmission system according to claim 1, wherein the DC power transmission system is a multi-terminal DC power transmission system in which three or more AC systems are interconnected by a DC line.

9. The protection system for a DC power transmission system according to claim 1, wherein a bidirectional semiconductor switch is used in place of the bypass switch.

10. The protection system for a DC power transmission system according to claim 1, wherein, as the DC circuit breaker, a DC circuit breaker of a forced arc-extinguishing scheme is used in which a precharged capacitor is discharged such that a resonance current with a reactor is superimposed on a direct current to form a current zero point.

11. The protection system for a DC power transmission system according to claim 1, wherein, as the DC circuit breaker, a DC circuit breaker of a self-excited-oscillation arc-extinguishing scheme is used in which a current zero point is formed by a current oscillation magnifying phenomenon due to an interaction between an arc and a commutation circuit.

12. The protection system for a DC power transmission system according to claim 1, wherein, as the DC circuit breaker, a DC circuit breaker of a semiconductor scheme is used in which a semiconductor element performs an interruption.

13. An AC-DC converter provided between an AC system and a DC power transmission system, the AC-DC converter converting AC power from the AC system to DC power to supply the DC power via a DC circuit breaker to the DC power transmission system, wherein
 a bypass switch capable of short-circuiting a converter cell included in the AC-DC converter is connected to an inside of the AC-to-DC converter or an outside of the AC-to-DC converter on an AC side, and
 the AC-DC converter further comprises a current limiter inside the AC-DC converter for each phase.

14. An AC-DC converter provided between an AC system and a DC power transmission system, the AC-DC converter converting AC power from the AC system to DC power to supply the DC power via a DC circuit breaker to the DC power transmission system, wherein
 a bypass switch capable of short-circuiting a converter cell included in the AC-DC converter is connected to an inside of the AC-to-DC converter or an outside of the AC-to-DC converter on an AC side, and
 the bypass switch is provided for each of the converter cells.

15. An AC-DC converter provided between an AC system and a DC power transmission system, the AC-DC converter converting AC power from the AC system to DC power to supply the DC power via a DC circuit breaker to the DC power transmission system, wherein
 a bypass switch capable of short-circuiting a converter cell included in the AC-DC converter is connected to an inside of the AC-to-DC converter or an outside of the AC-to-DC converter on an AC side, and
 the bypass switch is provided for a cell group including two or more of the converter cells connected in series.

16. A method of interrupting a DC power transmission system, the method being for use in a configuration including an AC-DC converter between an AC system and a DC power transmission system, an AC circuit breaker between the AC system and the AC-DC converter, a DC circuit breaker between the DC power transmission system and the AC-DC converter, and a bypass switch connected to an inside of the AC-DC converter or an outside of the AC-DC converter on an AC side, the bypass switch being capable of short-circuiting a converter cell included in the AC-DC converter, the method comprising:
 a step of turning on the bypass switch when a fault occurs in the DC power transmission system;
 a step of performing an interruption by the AC circuit breaker after the bypass switch is turned on; and
 a step of performing an interruption by the DC circuit breaker after the interruption by the AC circuit breaker.

* * * * *